Jan. 11, 1949.  J. H. ORR  2,459,089
FOLDING HOOD FOR MOTOR VEHICLES AND THE LIKE
Filed Sept. 18, 1947  2 Sheets-Sheet 1

INVENTOR.
JOHN H. ORR
BY Mawhinney & Mawhinney
ATTORNEYS.

Jan. 11, 1949. J. H. ORR 2,459,089
FOLDING HOOD FOR MOTOR VEHICLES AND THE LIKE
Filed Sept. 18, 1947 2 Sheets-Sheet 2

INVENTOR.
JOHN H. ORR
BY
ATTORNEYS.

Patented Jan. 11, 1949

2,459,089

UNITED STATES PATENT OFFICE 2,459,089

FOLDING HOOD FOR MOTOR VEHICLES AND THE LIKE

John H. Orr, Coventry, England, assignor to Carbodies Limited, Coventry, England Application September 18, 1947, Serial No. 774,772
In Great Britain September 25, 1946

6 Claims. (Cl. 296—117)

It is known to operate a folding head of a drop-head automobile by means of a reversible electric motor, the head having a main hoop pivotally mounted on opposite sides of the automobile body and connected with the motor through gearing so as to be fully raised when the motor is operated in one direction and fully lowered when the motor is operated in the other direction.

A reversible electric motor for use on an automobile (i. e., to be energized from the usual automobile battery) is, however, a relatively-expensive item, and one of the objects of the present invention is to provide a more economical electric operating apparatus for a head.

According to the invention, a folding head, for a drop-head automobile body or the like, includes a main hoop pivotally mounted on opposite sides of the automobile body, an electric motor adapted to drive a rotary member through gearing, and a connection between the rotary member and the main hoop such that one part of a revolution of the rotary member will move the hoop from the fully lowered to the fully raised position and the remaining part of the revolution of the rotary member will return the hoop to the lowered position.

Of the accompanying drawings.

Equivalent parts of the two constructions are indicated by similar reference characters as far as possible.

Figure 1:
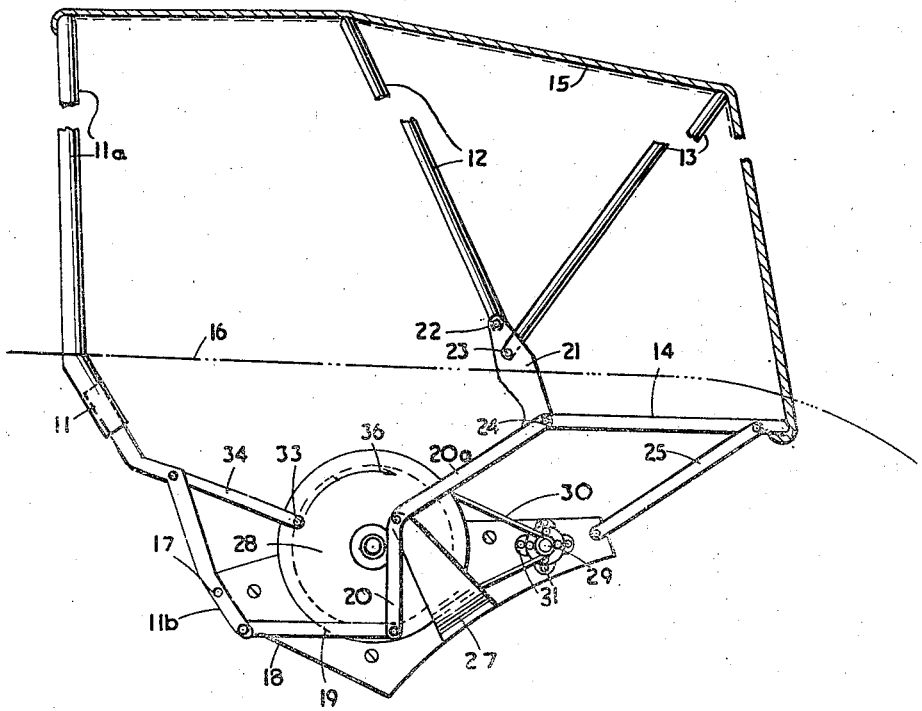
Figure 1 is a side elevation of one form of the folding head, shown in its erected position, according to the invention, the head fabric being shown in section and the automobile body being indicated by chain-dotted lines.
Figure 2:
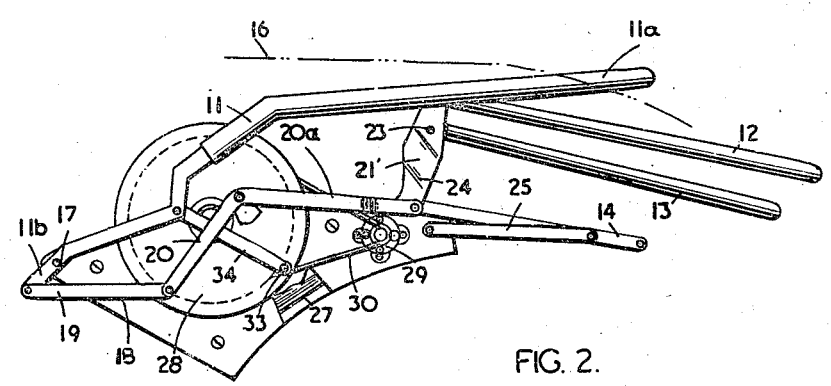
Figure 2 is a view corresponding with Figure 1 but showing the head in its fully lowered position, the fabric being omitted for the sake of clearness.

In the construction of Figures 1 and 2 the head comprises a forward main hoop 11, subsidiary hoops 12, 13 and 14, and the head fabric 15. The main hoop has an upper portion 11a which, when the head is erected, is perpendicular to the upper edge 16 of the automobile body. The arms 11b of the hoop 11 are continued downwardly below their pivotal mountings 17 (one only of which is shown) on brackets 18 fast with the automobile body, and their lower extremities are connected by links 19 to bell-cranks 20. These have arms 21 fast therewith to which the subsidiary hoops 12, 13 and 14 are respectively pivoted at 22, 23 and 24 so that the subsidiary hoops will be lowered or raised simultaneously with the main hoop 11. The hoops 14 are additionally linked at 25 to the adjacent brackets 18, the links 25 being substantially parallel to the longer arms 20a of the bell-cranks 20.

Each of the bell-cranks 20 is pivoted in a bracket 27 which is fast with the appropriate bracket 18, and one of the latter brackets 18 rotatively supports a rotary member 28 which can be driven from a fractional horse-power electric motor 29 through a driving belt 30 or other suitable reduction gearing. The motor 27 is shown as being bolted at 31 to the bracket 18 although it may equally well be supported in other ways and in a different position from that shown.

A crank pin 33 carried by the rotary member 28 is connected by a link 34 to the main hoop 11.

A manually-operable switch (not shown) disposed in a suitable position in the automobile (say, on the facia board) and included in the circuit of the motor 29 enables the rotary member 28 to be rotated through 180° or thereabouts at a time (and in the direction of the arrow 36) for moving the hoops from the position shown in Figure 1 to that shown in Figure 2 for lowering the head, and vice versa for raising the head. The latter may be locked in its raised position in any convenient manner.

When applying the drive to different forms of head, of the character above-mentioned, the use of different links connecting the rotary member to selected points of the main hoop will obviously be involved.

Figure 3:
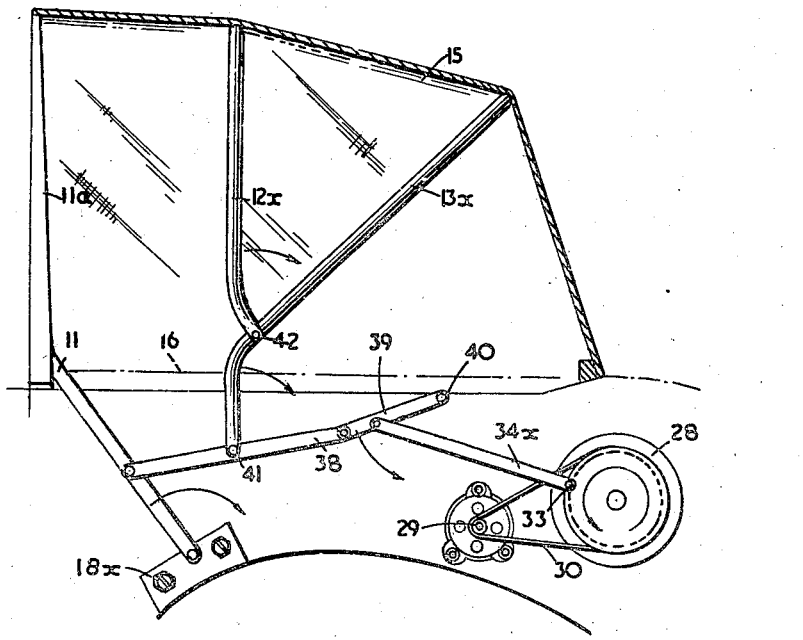
Figure 3 is a view similar to Figure 1 but showing another form of head.

In the construction of Figure 3 the main hoop 11 is pivoted at the bottoms of its arms to brackets 18x fast with the automobile body and is connected on each side to a two-link toggle 38, 39 connected to a fixed pivot 40. The toggle is not quite straightened when the head is fully raised, being materially collapsed when the head is fully lowered. In this case the rotary member 28 has its crank pin 33 connected by a link 34x to an appropriate point on the toggle link 39. The toggle link 38, and the corresponding toggle link on the other side, are pivoted at 41 to the subsidiary hoop member 13x and the latter has the hoop member 12x pivoted to it at 42 so that the hoop members 12x and 13x will be lowered and raised in unison with the main hoop 11 during each half revolution, approximately of the rotary member 28, the arrows in Figure 3 indicating the directions of movement of the link 39 and the hoops 11, 12x and 13x when the head is being lowered.

With such arrangements it is possible to provide a relatively-large rear light (not shown) in the head as the parts can be disposed in a satisfactory manner to allow of the accommodation of the head, with such a light, when folded.

What I claim as my invention and desire to secure by Letters Patent of the United States is:

1. A drop-head automobile body including a main hoop, for supporting the front edge of the head fabric, pivotally mounted on opposite sides of the automobile body, a rotary disc, a rotary type of motor connected to drive said disc, said disc carrying a crank pin, and a connecting rod between said crank pin and said main hoop such that when said motor is operated one part of a revolution of said disc will move said main hoop from the fully lowered to the fully raised position and the remaining part of the revolution of said disc will return said main hoop to said lowered position.

2. A drop-head automobile body including a main hoop, for supporting the front edge of the head fabric, pivotally mounted on opposite sides of the automobile body, a rotary disc carrying a crank pin, a rotary type of motor, said disc and motor supported from a bracket fast with the body, a belt drive between said motor and disc, and a connecting rod between said crank pin and said main hoop such that when said motor is operated one part of a revolution of said disc will move said main hoop from the fully lowered to the fully raised position and the remaining part of the revolution of said disc will return said main hoop to said lowered position.

3. A drop-head automobile body including a main hoop, for supporting the front edge of the head fabric, pivotally mounted on opposite sides of the automobile body, subsidiary hoops, for supporting the rear portion of the head fabric, pivotally mounted at opposite sides of the automobile body, a rotary disc carrying a crank pin, a rotary type of motor, a speed reduction belt drive between said motor and disc, a connecting rod between said crank pin and said main hoop such that when said motor is operated one part of a revolution of said disc will move said main hoop from the fully lowered to the fully raised position and the remaining part of the revolution of said disc will return said main hoop to said lowered position, and connections between said main and subsidiary hoops whereby the latter are raised and lowered simultaneously with said main hoop.

4. A drop-head automobile body comprising a main hoop, for supporting the front edge of the head fabric, pivotally mounted on opposite sides of the automobile body, the arms of said main hoop extending downwardly beyond the pivots, bell-cranks respectively pivoted at opposite sides of said body, links respectively connecting the downward extensions of said arms to said bell-cranks, subsidiary hoops, for supporting the rear portion of the head fabric, having their arms respectively pivoted to said bell-cranks, a rotary member, a rotary type of motor, gearing interconnecting said motor and member, and a link connecting said member to said main hoop such that when said motor is operated one part of a revolution of said member will move said main and subsidiary hoops from the fully lowered to the fully raised position and the remaining part of the revolution of said member will return said hoops to said lowered position.

5. A drop-head automobile body comprising a main hoop, for supporting the front edge of the head fabric, pivotally mounted on opposite sides of the automobile body, two-link toggles respectively connecting the arms of said hoop to the adjacent sides of said body, subsidiary hoops, for supporting the rear portion of the head fabric, having their arms pivotally connected to those of said toggle links which are pivoted to said main hoop, a rotary member, a rotary type of motor, gearing interconnecting said motor and member, and a link connecting said member to the toggle-link, of the adjacent toggle, which is pivoted to said body so that when said motor is operated one part of a revolution of said member will move said main and subsidiary hoops from the fully lowered to the fully raised position and the remaining part of the revolution of said member will return said hoops to said lowered position.

6. A drop-head automobile body, according to claim 5 and including two subsidiary hoops, of which the rear hoop has its arms directly pivoted to the toggle-links, and of which the hoop intermediate the main and rear ones has its arms pivoted to those of the rear hoop.

JOHN H. ORR.

REFERENCES CITED

The following references are of record in the file of this patent:

UNITED STATES PATENTS

| Number | Name | Date |
|---|---|---|
| 2,121,233 | Horton | June 21, 1938 |
| 2,151,643 | Shu | Mar. 21, 1939 |
| 2,255,911 | Burnison | Sept. 16, 1941 |
| 2,329,802 | Westrope | Sept. 21, 1943 |

FOREIGN PATENTS

| Number | Country | Date |
|---|---|---|
| 447,641 | Great Britain | May 22, 1936 |